United States Patent [19]

Okamoto

[11] Patent Number: 5,322,882
[45] Date of Patent: Jun. 21, 1994

[54] POLYCARBONATE/POLYORGANOSILOXANE COMPOSITION

[75] Inventor: Masaya Okamoto, Ichihara, Japan

[73] Assignee: Idemitsu Petrochemical Co., Ltd., Tokyo, Japan

[21] Appl. No.: 6,177

[22] Filed: Jan. 15, 1993

Related U.S. Application Data

[63] Continuation of Ser. No. 443,558, Nov. 29, 1989, abandoned.

[30] Foreign Application Priority Data

Dec. 26, 1988 [JP] Japan .................. 63-326349

[51] Int. Cl.⁵ .................. C08L 69/00; C08L 51/00
[52] U.S. Cl. ........................ 524/537; 524/588; 525/462; 525/464; 525/474
[58] Field of Search ............... 524/537, 588; 525/462, 525/464, 474

[56] References Cited

U.S. PATENT DOCUMENTS

| | | | |
|---|---|---|---|
| 3,419,635 | 12/1968 | Vaughn, Jr. ............... | 528/25 |
| 3,640,943 | 2/1972 | Bostick et al. ............. | 260/375 B |
| 4,126,740 | 11/1978 | Factor et al. .............. | 528/29 |
| 4,147,707 | 4/1979 | Alewelt et al. ............ | 524/611 |
| 4,161,469 | 7/1979 | LeGrand et al. .......... | 525/439 |
| 4,167,536 | 9/1979 | Factor ....................... | 525/450 |
| 4,224,215 | 9/1980 | Macke ....................... | 524/611 |
| 4,224,215 | 9/1980 | Macke ....................... | 524/611 |
| 4,612,238 | 9/1986 | Della Vecchia et al. ..... | 428/228 |
| 4,616,042 | 10/1986 | Avakian . | |
| 4,732,949 | 3/1988 | Paul et al. .................. | 525/464 |
| 5,037,937 | 8/1991 | Komatsu et al. . | |

FOREIGN PATENT DOCUMENTS

| | | |
|---|---|---|
| 278498 | 8/1988 | European Pat. Off. . |
| WO8000084 | 1/1980 | PCT Int'l Appl. . |
| WO9100885 | 1/1991 | World Int. Prop. O. . |

Primary Examiner—Paul R. Michl
Assistant Examiner—Edward J. Cain
Attorney, Agent, or Firm—Frishauf, Holtz, Goodman & Woodward

[57] ABSTRACT

A polycarbonate-based resin composition excelling in not only impact resistance but also other physical properties comprises 6 to 90% by weight of a polycarbonate/polyorganosiloxane copolymer, 10 to 60% by weight of glass fibers and 0 to 84% by weight of a polycarbonate resin. The amount of the polyorganosiloxane contained in the resin components is in a range of 0.5 to 40% by weight.

17 Claims, No Drawings

POLYCARBONATE/POLYORGANOSILOXANE COMPOSITION

This application is a continuation of application Ser. No. 07/443,558, filed Nov. 29, 1989 now abandoned.

BACKGROUND OF THE INVENTION

1. Field of the Invention

The present invention relates to a polycarbonate-based resin composition and, more particularly, to a glass fiber-reinforced polycarbonate-based resin composition excelling specially in impact resistance and is suitable for use in various industrial materials.

Prior Art

Polycarbonate resins excel in mechanical strength, electrical characteristics, transparency, etc., and find various applications in the form of engineering plastics.

Additionally, there is known a glass fiber-reinforced polycarbonate resin in which glass fibers are incorporated into a polycarbonate resin to improve its rigidity and dimensional stability.

However, the addition of glass fibers tends to give rise to a drop of Izod impact strength due to brittle fracture. For that reason, compositions comprising such glass fiber-reinforced polycarbonate resins and further including an organo-polysiloxane have been proposed (see Japanese Patent Publication No. 35929/1984 and Japanese Patent Laid-Open (Kokai) Publication No. 501860/1982).

A problem with molded or otherwise shaped articles obtained from such compositions is, however, that they are poor in insulating properties.

With that problem in mind, compositions of glass fiber-reinforced polycarbonate resins containing a small amount of organopolysiloxane/polycarbonate copolymers have been proposed (see Japanese Patent Kokai Publication No. 160052/1980).

While such compositions are improved in terms of impact resistance to some extent, their impact resistance is still not enough to find use in fields for which especially high impact resistance is needed, for instance, chassis or electrically powered tool fields.

SUMMARY OF THE INVENTION

As a result of extensive and intensive studies made to provide a solution to the above problems, it has been found that a polycarbonate-based resin composition excelling in not only impact resistance but also rigidity, dimensional stability, etc. can be obtained by using a polycarbonate/polyorganosiloxane copolymer, glass fibers and a polycarbonate resin at a specific proportion. Such findings underlie the present invention.

More specifically, the present invention provides a polycarbonate-based resin composition, characterized by comprising 6 to 90% by weight of a polycarbonate/polyorganosiloxane copolymer, 10 to 60% by weight of glass fibers and 0 to 84% by weight of a polycarbonate resin, and in that the amount of said polyorganosiloxane accounts for 0.5 to 40% by weight of the resin components.

DETAILED DESCRIPTION OF THE INVENTION

The polycarbonate/polyorganosiloxane copolymer used in the present invention is comprised of a polycarbonate segment having repeating units expressed by the following formula I:

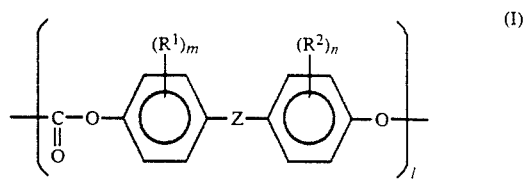

wherein:

Z is single bond, ether bond, alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a sulfonyl group, a sulfoxide group, a carbonyl group, sulfide group or a group:

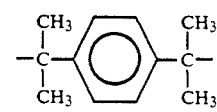

$R^1$ and $R^2$, which may be identical with or different from each other, each stand for a hydrogen atom, a halogen atom or an alkyl group having 1 to 8 carbon atoms, m and n each stand for an interger of 1 to 4, provided that when m is 2 or more, $R^1$ may be identical or different and when n is 2 more, $R^2$ may be identical or different, and l is between 3 and 50, and a polyorganosiloxane segment having repeating units expressed by the following formula II:

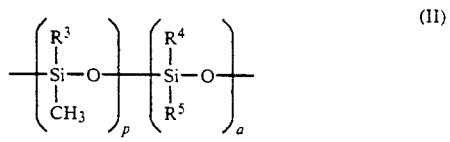

wherein:

$R^3$, $R^4$ and $R^5$, which may be identical with or different from one another, each stand for a hydrogen atom, an alkyl group having 1 to 6 carbon atoms or a phenyl group, and p and q each are an interger of 1 or more. Usually, the polyorganosiloxane segment has a degree of polymerization of 5 to 300.

The above polycarbonate/polyorganosiloxane copolymer is a block copolymer comprising the polycarbonate segment having repeating units expressed by the general formula I and the polyorganosiloxane segment having repeating units expressed by the general formula II, and has a viscosity-average molecular weight of 10,000 to 40,000, preferably 15,000 to 35,000.

For instance, such a polycarbonate/polyorganosiloxane copolymer may be prepared by dissolving a pre-prepared polycarbonate oligomer forming the polycarbonate segment and a polyorganosiloxane having a terminal reactive group and forming the polyorganosiloxane segment in a solvent such as methylene chloride, chlorobenzene or pyridine, adding an aqueous sodium hydroxide solution of bisphenol to the resulting solution and subjecting that solution to an interface reaction with a catalyst such as triethylamine or trimethylbenzyl-ammonium chloride. Use may also be made of polycarbonate/polyorganosiloxane copolymers prepared by such methods as set forth in Japanese Patent Publication Nos. 30108/1969 and 20510/1970.

The polycarbonate having repeating units expressed by the general formula I may be prepared by a solvent method in which a divalent phenol is allowed to react with a carbonate precursor such as phosgene or subjected to an ester exchange reaction with a carbonate precursor such as diphenyl carbonate in a solvent such as methylene chloride in the presence of an acid acceptor and a molecular-weight regulator, both known in the art.

The divalent phenols preferably used in the present invention include bisphenols. Particular preference is given to 2,2-bis(4-hydroxyphenyl) propane (bisphenol A). The bisphenol A may be partly or wholly substituted by other divalent phenols. As the divalent phenols other than the bisphenol A, reference may be made to compounds such as, for instance, (4-hydroxyphenyl) alkanes, hydroquinone, 4,4'-dihydroxy-diphenyl, bis(4-hydroxy-phenyl) cycloalkanes, bis(4-hydroxyphenyl) sulfide, bis(4-hydroxyphenyl) sulfone, bis(4-hydroxyphenyl) sulfoxide, bis(4-hydroxyphenyl) ether and bis(4-hydroxyphenyl) ketone or halogenated bisphenols such as bis(3,5-dibromo-4-hydroxyphenyl) propane and bis (3,5-dichloro-4-hydroxyphenyl) propane.

The polycarbonate may be a homopolymer (oligomer) with one of such divalent phenols or a copolymer with two or more thereof. Alternatively, it may be a thermoplastic branched polycarbonate obtained by using the above divalent phenols in combination with a polyfunctional aromatic compound.

For instance, the polyorganosiloxane expressed by the general formula II may be obtained by the reaction of a dialkyldichlorosilane and/or diaryldichlorosilane with water. The monomer of such a polyorganosiloxane may include dimethylsiloxane or methylphenylsiloxane.

Such a polycarbonate/polyorganosiloxane copolymer as mentioned above is incorporated into the composition at a proportion of 6 to 90% by weight, preferably 15 to 80% by weight. If the quantity of said copolymer is less than 6% by weight, there is then no improvement in impact resistance. In a quantity higher than 90% by weight, on the other hand, there is a drop of dimensional stability.

The quantity of the polyorganosiloxane contained in the resin except the glassy component (a total quantity of the polycarbonate/polyorganosiloxane copolymer + the polycarbonate resin) is 0.5 to 40% by weight, preferably 1.0 to 35% by weight. If the quantity of the polyorganosiloxane is below 0.5% by weight, there is then no improvement in impact resistance. In a quantity exceeding 40% by weight, on the other hand, any copolymer having sufficient molecular weight cannot be obtained.

Referring then to the glass fibers used in the present invention, any one of alkali-containing glass, low-alkali glass and non-alkali glass may be used to this end. Preferably, the glass fibers used are 1 to 8 mm, particularly 3 to 6 mm in length and 3 to 20 μm, particularly 5 to 15 μm in diameter. The glass fibers may be used in any nonrestrictive forms such as rovings, milled fibers and chopped strands, and may be used alone or in combination of two or more.

As such glass fibers, use may also be made of those surface-treated with silane coupling agents such as aminosilanes, epoxy-silanes, vinylsilanes or methacrylsilanes, or chromium complex compounds, boron compounds or like other compounds to improve their affinity with respect to the polycarbonate/polyorgano-siloxane copolymers and polycarbonate resins.

Such glass fibers as mentioned above are incorporated into the composition at a proportion of 10 to 60% by weight, preferably 15 to 55% by weight. A proportion of the glass fibers less than 10% by weight is unpreferred, since there is then a drop of dimensional stability. A proportion of the glass fibers exceeding 60% by weight is again unpreferred, since kneading is unfeasible.

According to the present invention, a polycarbonate resin may be used, if required.

The polycarbonate resin has repeating units expressed by the general formula I and, as mentioned above, may be easily obtained by the reaction of a divalent phenol with phosgene by way of example. The divalent phenols used may include such phenols as already mentioned.

The polycarbonate resin used in the present invention has a viscosity-average molecular weight of preferably 10,000 to 100,000, most preferably 20,000 to 40,000.

The polycarbonate resin is incorporated into the composition at a proportion of 0 to 84% by weight, preferably 0 to 70% by weight. If the proportion of the polycarbonate resin exceeds 84% by weight, there is then no improvement in impact resistance.

The polycarbonate-based resin composition according to the present invention is essentially comprised of the above poly-carbonate/polyorganosiloxane copolymer, glass fibers and poly-carbonate resin, and may additionally contain any various additives, if required, provided that the object of the present invention is achievable. For instance, carbon fibers, metal fibers, inorganic fillers, metal powders, UV absorbers, flame retardants, colorants, etc. may be added.

The polycarbonate-based resin composition according to the present invention may be obtained by blending and kneading the above components together To this end, blending and kneading may be carried out in conventional manners with, for instance, ribbon blenders, Henschel mixers, Banbury mixers, drum tumblers, single-, twin- or multi-screw extruders, Ko-kneaders or like other equipment. For kneading, a heating temperature of 250 to 300° C. is usually applied.

The polycarbonate-based resin composition according to the present invention excels in not only impact resistance but also rigidity expressed in terms of bending strength and tensile modulus of elasticity or dimensional stability.

Thus, the present compositions are effectively used in various industrial fields inclusive of electric/electronic fields, in particular fields for which high impact resistance is needed, e.g., chassis, or similar other fields

EXAMPLES

The present invention will now be explained in more detail with reference to the following examples.

PREPARATION EXAMPLE 1—

Preparation of reactive Polykimethyl-Siloxane

Over two hours, a mixture of 100 g of water with 206 g of dioxane was added to 800 g of dimethyldichlorosilane. Under mild reflux, the resulting mixture was heated, while stirred, into a homogeneous state. The mixture was stripped in vacuo and brought up to 202° C. at a pressure 12 mmHg. Then, the stripped product was filtrated to obtain a transparent oily product. Dissolved in 130 g of dry dichloromethane were 225 g of such an oily product, and the solution was added under intensive agitation to a mixture of 114 g of bisphenol A, 130 g of dry pyridine and 1300 g of dichloromethane over 65 minutes. Afterwards, the product was alkali-washed with 1000 g of an aqueous solution of sodium hydroxide (0.01N), then acid-washed with 1000 g of hydrochloric acid (0.1 N) and finally washed with 1000 g of water. Removal of dichloromethane by evaporation gave the end reactive polydimethylsiloxane (reactive PDMS for short) having a terminal phenolic hydroxyl group.

PREPARATION EXAMPLE 1—2

Preparation of reactive PDMS

In Preparation Example 1—1, the amount of the first mentioned water was changed from 100 g to 140 g. Under otherwise similar conditions, the reactive PDMS was obtained.

PREPARATION EXAMPLE 1—3

Preparation of Reactive PDMS

As the reactive PDMS, use was made of silicone oil reactive at both terminals (KF 6002, Shinetsu Silicone Co., Ltd.).

PREPARATION EXAMPLE 1-4

Preparation of Reactive PDMS

Mixed together were 1483 g of octamethylcyclotetrasiloxane, 137 g of 1,1,3,3-tetramethyldisiloxate and 35 g of 86% sulfuric acid, and the mixture was stirred at room temperature for 17 hours. Afterwards, an oily phase was separated, and 25 g of sodium hydrogencarbonate were added thereto, followed by one hour stirring. After filtration, the product was distilled in vacuo at 150° C. and 3 mmHg to remove low-boiling matters. Added to a mixture of 60 g of 2-allylphenol with 0.0014 g of platinum in the form of a platinum/alcoholate complex were 294 g of the above-obtained oil at a temperature of 90° C. The mixture was stirred for 3 hours, while maintained at a temperature of 90° C. to 115° C. The product was extracted wi chloride and washed with three portions of 80% aqueous methanol to remove excessive 2-allylphenol. The product was dried over anhydrous sodium sulfate and rid of the solvents in vacuo at a temperature of up to 115° C. to obtain the reactive PDMS.

PREPARATION EXAMPLE 1-5

Preparation of Reactive PDMS

As the reactive PDMS, use was made of silicone oil reactive at both terminals (X-22-165B, Shinetsu Silicone Co., Ltd.).

PREPARATION EXAMPLE 1-6

Preparation of Reactive PDMS

As the reactive PDMS, use was made of silicone oil reactive at both terminals (X-22-165C, Shientsu Silicone Co., Ltd.).

PREPARATION EXAMPLE 2

Preparation of Polycarbonate Oligomer

Sixty (60) kg of bisphenol A were dissolved in 400 liters of a 5% aqueous solution of sodium hydroxide to prepare an aqueous solution of bisphenol A in sodium hydroxide. Then, the solution was maintained at room temperature. The aqueous sodium hydroxide solution of bisphenol A and methylene chloride were introduced at the respective flow rates of 138 liters per hour and 69 liters per hour into a tubular reactor of 10 mm in inner diameter and 10 m in length through an orifice plate, into which 10.7 kg/hour of phosgene were blown in cocurrent relation thereto, for three-hour continuous reactions. The tubular reactor used was of a double structure designed to pass cooling water through an outer jacket to keep the discharge temperature of the reaction solution at 25° C. The discharge solution was also regulated to pH 10-11. The thus obtained reaction solution was allowed to stand to separate and remove an aqueous phase, thereby obtaining a methylene chloride phase (220 liters), to which 170 liters of methylene chloride were added under sufficient agitation to obtain a polycarbonate oligomer (with a concentration of 317 g/liters). This polycarbonate oligomer (PC oligomer for short) was found to have a degree of polymerization of 3-4.

PREPARATION EXAMPLE 3-1

Preparation of PC-PDMS Copolymer A

Dissolved in 2 liters of methylene chloride were 160 g of the reactive PDMS obtained in Preparation Example 1—1, and the solution was mixed with 10 liters of the PC oligomer obtained in Preparation Example 2. Added to the mixture were 26 g of sodium hydroxide dissolved in 1 liter of water and 5.7 cc of triethylamine, followed by one-hour stirring at 500 rpm and room temperature. Afterwards, 600 g of bisphenol A dissolved in 5 liters of an aqueous solution of 5.2% by weight sodium hydroxide, 8 liters of methylene chloride and 81 g of p-tert.-butylphenol were added to the solution, followed by two-hour stirring at 500 rpm and room temperature. Thereafter, an additional 5 liters of methylene chloride were added to the solution, and the resulting product was washed with 5 liters of water, then alkali-washed with 5 liters of a 0.01 N aqueous solution of sodium hydroxide, then acid-washed with 5 liters of 0.1 N hydrochloric acid and finally washed with 5 liters of water. Subsequent removal of methylene chloride gave a PC-PDMS copolymer A in the form of chips, which found to have a PDMS content of 3.5% by weight.

PREPARATION EXAMPLE 3-2

Preparation of PC-PDMS Copolymer

In Preparation Example 3-1, 500 g of the reactive PDMS obtained in Preparation Example 1-2 were used in place of 160 g of the reactive PDMS obtained in Preparation Example 1—1. Under otherwise similar conditions as in Preparation Example 3-1, a PC-PDMS copolymer B was prepared, which was found to have a PDMS content of 10% by weight.

PREPARATION EXAMPLE 3—3

Preparation of PC-PDMS Copolymer

In Preparation Example 3-1, 2.6 kg of the reactive PDMS obtained in Preparation Example 1-2 were used in place of 160 g of the reactive PDMS obtained in Preparation Example 1—1 and the amount of sodium hydroxide used was changed from 26 g to 50 g. Under otherwise similar conditions as in Preparation Example 3-1, a PC-PDMS copolymer C was prepared, which was found to have a PDMS content of 29% by weight.

PREPARATION EXAMPLE 3-4

Preparation of PC-PDMS Copolymer D

Dissolved in 9.5 liters of the PC oligomer obtained in Preparation Example 2 were 480 g of the reactive PDMS obtained in Preparation Example 1-3 (silicone oil reactive at both terminals), and 101 g of triethylamine were slowly added dropwise to the solution under agitation. After the dropwise addition, the solution was stirred for 1 hour and then acid-washed with 5 liters of 0.1 N hydrochloric acid to separate an organic phase. Thereafter, added to the solution were 600 g of bisphenol A dissolved in 5 liters of an aqueous solution of 5.2% by weight sodium hydroxide, 8 liters of methylene chloride and 25 g of p-tert.-butylphenol, followed by two-hour stirring at 500 rpm and room temperature. After that, additional 5 liters of methylene chloride were added to the solution, which was in turn washed with 5 liters of water, then alkali-washed with 5 liters of a 0.01 N aqueous solution of sodium hydroxide, then acid-washed with 5 liters of 0.1 N hydrochloric acid and finally washed with 5 liters of water. Subsequent removal of methylene chloride gave a PC-PDMS copolymer D in the form of chips, which was found to have a PDMS content of 3.9% by weight.

PREPARATION EXAMPLE 3-5

Preparation of PC-PDMS Copolymer E

As the PC-PDMS copolymer, use was made of Macrolon Type 1207 produced by Bayer Corp., which had a PDMS content of 4.8% by weight.

It is understood that the PDMS contents of the above PC-PDMS copolymers were all determined by H NMR.

PREPARATION EXAMPLE 3-6

Preparation of PCPDMS Copolymer F

In Preparation Example 3-1, the reactive PDMS obtained in Preparation Example 1-4 was used in place of the reactive PDMS obtained in Preparation Example 1—1. Under otherwise similar conditions as in Preparation Example 3—1, a PC-PDMS copolymer F was obtained, which was found to have a PDMS content of 3.5% by weight.

PREPARATION EXAMPLE 3-7

Preparation of PC-PDMS Copolymer G

In Preparation Example 3-1, the reactive PDMS obtained in Preparation Example 1-5 was used in place of the reactive PDMS obtained in Preparation Example 1—1. Under otherwise similar conditions as in Preparation Example 3-1, a PC-PDMS copolymer G was obtained, which was found to have a PDMS content of 3.5% by weight.

PREPARATION EXAMPLE 3-8

Preparation of PC-PDMS Copolymer H

In Preparation Example 3-1, the reactive PDMS obtained in Preparation Example 1-6 was used in place of the reactive PDMS obtained in Preparation Example 1—1. Under otherwise similar conditions as in Preparation Example 3-1, a PC-PDMS copolymer H was obtained, which was found to have a PDMS content of 3.5% by weight.

EXAMPLES 1-18 AND COMPARATIVE EXAMPLES 1-5

The PC-PDMS copolymers A-H obtained in Preparation Examples 3-1 to 3-8, polycarbonate (having an average molecular weight of 25,000; and available under the trade name of Toughron A-2500, produced by Idemitsu Petrochemical Co., Ltd.) and glass fibers (non-alkali glass surface-treated with aminosilane; and 6 mm in length and 13 μm in diameter) were blended together at the proportions specified in Table 1, and the blends were formed through a 30-mm vented extruder into pellets, which were in turn injection-molded at a temperature of 300° C. to obtain molded samples for the determination of their physical properties. The results are set forth in Table 1. It is understood that the glass fibers were supplied downstream of the hopper of the extruder through which the resin stock was fed in.

TABLE 1

| | PC-PDMS Copolymer | | Polycarbonate (weight %) | PDMS Content of Resin Components (weight %) | Glass fibers (weight %) | Izod Impact Strength[1] (kg·cm/cm) | Tensile Modulus[2] (kg/cm$^2$) | Bending Strength[3] (kg/cm$^2$) |
|---|---|---|---|---|---|---|---|---|
| | Types | Amount (weight %) | | | | | | |
| Example 1 | A | 50 | 0 | 3.5 | 50 | 31 | 84800 | 2400 |
| Example 2 | A | 70 | 0 | 3.5 | 30 | 27 | 58900 | 1800 |
| Example 3 | A | 90 | 0 | 3.5 | 10 | 20 | 33500 | 1200 |
| Example 4 | B | 70 | 0 | 10 | 30 | 28 | 59000 | 1800 |
| Example 5 | C | 50 | 0 | 29 | 50 | 30 | 85200 | 2300 |
| Example 6 | C | 70 | 0 | 29 | 30 | 30 | 59000 | 1700 |
| Example 7 | C | 90 | 0 | 29 | 10 | 21 | 33600 | 1100 |
| Example 8 | D | 70 | 0 | 3.9 | 30 | 29 | 59100 | 1800 |
| Example 9 | A | 30 | 60 | 1.2 | 10 | 20 | 33700 | 1200 |
| Comparative Example 1 | — | 0 | 90 | 0 | 10 | 11 | 33700 | 1200 |
| Example 10 | C | 10 | 70 | 3.6 | 20 | 23 | 46300 | 1600 |
| Comparative Example 2 | — | 0 | 80 | 0 | 20 | 15 | 46500 | 1600 |
| Example 11 | B | 20 | 50 | 2.9 | 30 | 28 | 59000 | 1800 |
| Example 12 | B | 40 | 30 | 5.7 | 30 | 27 | 59200 | 1800 |
| Example 13 | B | 60 | 10 | 8.6 | 30 | 27 | 58900 | 1700 |
| Example 14 | C | 10 | 60 | 4.1 | 30 | 28 | 59000 | 1800 |
| Comparative Example 3 | C | 5 | 65 | 2.1 | 30 | 18 | 58900 | 1700 |
| Comparative Example 4 | — | 0 | 70 | 0 | 30 | 18 | 59000 | 1800 |
| Comparative Example 5 | — | 0 | 50 | 0 | 50 | 19 | 85000 | 2400 |

TABLE 1-continued

| | PC-PDMS Copolymer | | Polycarbonate (weight %) | PDMS Content of Resin Components (weight %) | Glass fibers (weight %) | Izod Impact Strength*1 (kg·cm/cm) | Tensile Modulus*2 (kg/cm²) | Bending Strength*3 (kg/cm²) |
|---|---|---|---|---|---|---|---|---|
| | Types | Amount (weight %) | | | | | | |
| Example 15 | E | 70 | 0 | 4.8 | 30 | 27 | 58900 | 1700 |
| Example 16 | F | 70 | 0 | 3.5 | 30 | 21 | 58800 | 1700 |
| Example 17 | G | 70 | 0 | 3.5 | 30 | 22 | 58900 | 1800 |
| Example 18 | H | 70 | 0 | 3.5 | 30 | 23 | 58800 | 1700 |

*1Measured according to JIS-K-7110
*2Measured according to JIS-K-7113
*3Measured according to JIS-K-7203

What is claimed is:

1. A polycarbonate-based resin composition comprising 10 to 80% by weight of a polycarbonate/polyorganosiloxane copolymer having a viscosity average molecular weight of 10,000 to 40,000 and comprising terminal t-butylphenol groups, wherein the polycarbonate is obtained from bisphenol A, 20 to 50% by weight of glass fibers and 0 to 70% by weight of a polycarbonate resin, the amount of said polyorganosiloxane accounting for 3.5 to 29% by weight of said resin components, the composition having an Izod impact strength of more than 23 kg·cm/cm.

2. The polycarbonate-based resin composition as claimed in claim 1, wherein the polycarbonate/polyorganosiloxane copolymer is comprised of a polycarbonate segment having repeating units expressed by the following formula I;

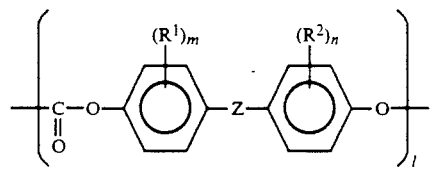

wherein:
Z is single bone, an ether bond, an alkylene group having 1 to 8 carbon atoms, an alkylidene group having 2 to 8 carbon atoms, a cycloalkylene group having 5 to 15 carbon atoms, a cyclo-alkylidene group having 5 to 15 carbon atoms, a sulfonyl group, a sulfoxide group, a carbonyl group, a sulfide group or a group:

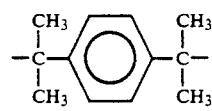

$R^1$ and $R^2$, which may be identical with or different from each other, each stand for a hydrogen atom, a halogen atom or an alkyl group having 1 to 8 carbon atoms, m and n each stand for an interger of 1 to 4, provided that when m is 2 or more, $R^1$ may be identical or different and when n is 2 or more, $R^2$ may be identical or different, and l is between 3 and 50, and a polyorganosiloxane segment having repeating units expressed by the following formula II;

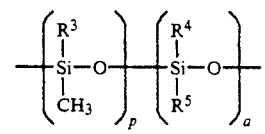

wherein:
$R^3$, $R^4$ and $R^5$, which may be identical with or different from one another, each stand for a hydrogen atom, a alkyl group having 1 to 6 carbon atoms or a phenyl group, and p a q each are an interger of 1 or more.

3. The polycarbonatebased resin composition as claimed in claim 1, wherein the amount of the polycarbonate/poly-organosiloxane copolymer is 15 to 80% by weight.

4. The polycarbonate-based resin composition as claimed in claim 1, wherein the glass fiber is surface-treated.

5. The polycarbonate-based resin as claimed in claim 1, wherein the composition comprises a polycarbonate having a viscosity-average molecular weight of 10,000 to 100,000.

6. The polycarbonate-based resin composition as claimed in claim 1, wherein the polycarbonate/polyorganosiloxane copolymer has a viscosity-average molecular weight of 15,000 to 35,000.

7. The polycarbonate-based resin composition as claimed in claim 1, wherein the glass fibers are 1 to 8 mm in length and 3 to 20 μm in diameter.

8. The polycarbonate-based resin composition as claimed in claim 6, wherein the glass fibers are 3 to 6 mm in length and 5 to 15 μm in diameter.

9. The polycarbonate-based resin composition as claimed in claim 8, wherein the composition comprises a polycarbonate resin having a viscosity-average molecular weight of 20,000 to 40,000.

10. The polycarbonate-based resin composition as claimed in claim 2, wherein the amount of the polycarbonate/polyarganosiloxane copolymer is 15 to 80% by weight; the glass fibers are surface treated, and have a length of 1 to 8 mm and a diameter of 3 to 20 μm; the composition comprises a polycarbonate resin having a viscosity-average molecular weight of 10,000 to 100,000 resin ; and the polycarbonate/polyorganosiloxane copolymer has a viscosity-average molecular weight of 15,000 to 35,000.

11. The polycarbonate-based resin composition as claimed in claim 10, wherein the glass fibers have a length of 3 to 6 mm and a diameter of 5 to 15 μm; and the composition comprises a polycarbonate resin having a viscosity-average molecular weight of 20,000 to 40,000.

12. The polycarbonate-based resin composition as claimed in claim 1, wherein said polycarbonate resin is in an amount of 10 to 70% by weight.

13. The polycarbonate-based resin composition as claimed in claim 1, wherein the polyorganosiloxane content is 10% by weight.

14. The polycarbonate-based resin composition as claimed in claim 2, wherein the polyorganosiloxane segment has a degree of polymerization of 5 to 300.

15. The polycarbonate-based resin composition as claimed in claim 12, wherein the polycarbonate/polyorganosiloxane copolymer is comprised of a polycarbonate segment having repeating units expressed by the following formula I:

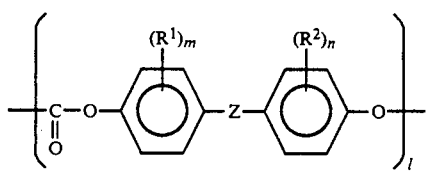

wherein Z is single bond, an ether bond, a alkylene group having 1 to 8 carbon atoms, an alkylidened group having 2 to 8 carbon atoms, a cylcoalkylene group having 5 to 15 carbon atoms, a cycloalkylidene group having 5 to 15 carbon atoms, a sulfonyl group, a fulfoxide group, a carbonyl group, a sulfide group or a group of the following formula:

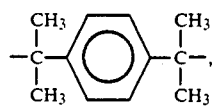

$R^1$ and $R^2$, which are identical with or different from each other, each is a hydrogen atom, a halogen atom or an alkyl group having 1 to 8 carbon atoms, m and n each is an integer of 1 to 4, provided that when m is 2 or more, $R^1$ is identical or different and when n is 2 or more, $R^2$ is identical or different, and l is between 3 and 50, and a polyorganosiloxane segment having repeating units expressed by the following formula II:

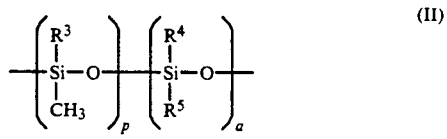

wherein $R^3$, $R^4$ and $R^5$, which are identical with or different from one another, each is a hydrogen atom, a alkyl group having 1 to 6 carbon atoms or a phenyl group, and p and q each is an integer of 1 or more.

16. The polycarbonate-based resin composition as claimed in claim 15, wherein the amount of the polycarbonate/polyorganosiloxane copolymer is 15 to 80% by weight; the glass fibers are surface treated and have a length of 1 to 8 mm and a diameter of 3 to 20 μm; the composition comprises a polycarbonate resin having a viscosity-average molecular weight of 10,000 to 100,000 and the polycarbonate/polyorganosiloxane copolymer has a viscosity-average molecular weight of 15,000 to 35,000

17. The polycarbonate-based resin composition as claimed in claim 16, wherein the glass fibers have a length of 3 to 6 mm and a diameter of 5 to 15 μm; and the composition comprises a polycarbonate resin having a viscosity-average molecular weight of 20,000 to 40,000.

* * * * *

UNITED STATES PATENT AND TRADEMARK OFFICE
CERTIFICATE OF CORRECTION

PATENT NO. : 5,322,882

DATED : June 21, 1994

INVENTOR(S) : Masaya OKAMOTO

It is certified that error appears in the above-identified patent and that said Letters Patent is hereby corrected as shown below:

Title page, right column, FOREIGN PATENTS DOCUMENTS, under "WO9100885  1/1991  World Int. Prop. O."

```
insert: --57-501860   10/1982    Japan
         59-35929      8/1984    Japan
         55-160052    12/1980    Japan
         44-30108     12/1969    Japan
         45-20510      7/1970    Japan--
```

Column 10, line 60 (claim 10) delete "resin".

Signed and Sealed this

Twenty-third Day of May, 1995

Attest:

BRUCE LEHMAN

*Attesting Officer*    *Commissioner of Patents and Trademarks*